(No Model.)
F. J. HUBBARD.
COLLAR FOR LOOSE PULLEYS.
No. 309,784.　　　　　　　　　　Patented Dec. 23, 1884.
Fig 1.
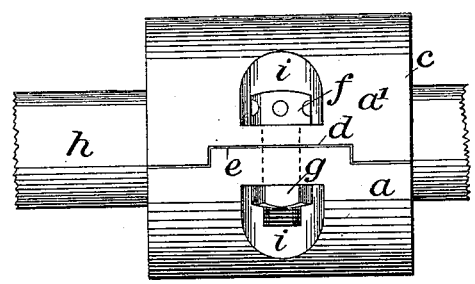
Fig 2.
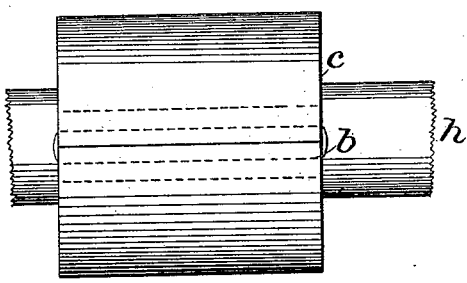
Fig. 3.
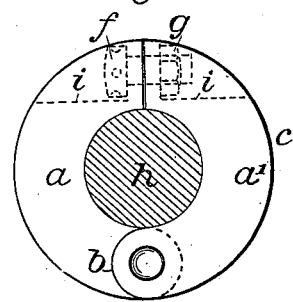
Fig. 4.
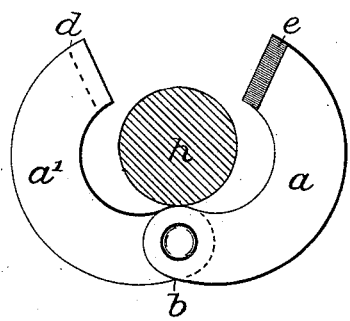
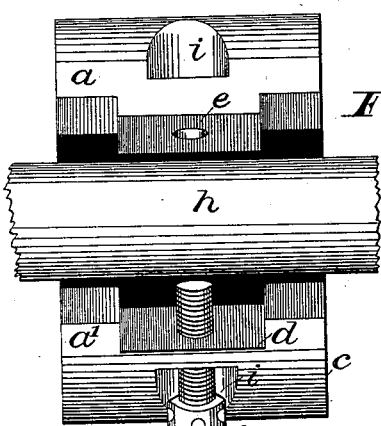
Fig. 5.
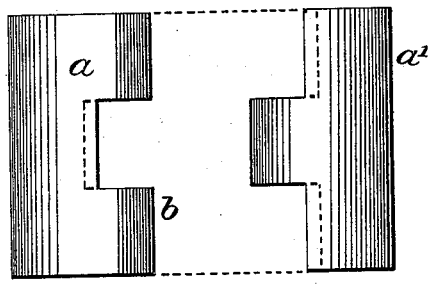
Fig. 6.
Witnesses;
H. Louis Clark
J. T. Conger
Inventor
Frederick J. Hubbard
per J. D. Clark
Attorney.

UNITED STATES PATENT OFFICE.

FREDERICK J. HUBBARD, OF CHICAGO, ILLINOIS.

COLLAR FOR LOOSE PULLEYS.

SPECIFICATION forming part of Letters Patent No. 309,784, dated December 23, 1884.

Application filed May 23, 1884. (No model.)

*To all whom it may concern:*

Be it known that I, FREDERICK J. HUBBARD, a citizen of the United States, residing at Chicago, in the county of Cook and State of Illinois, have invented certain new and useful Collars for Loose Pulleys, of which the following is a specification.

My invention relates to a peculiarly-constructed clamping device for holding loose pulleys from slipping sidewise on the shaft while in motion; and the object of my invention is to form a collar that is entirely free from flanges or lugs or projecting bolts on its outer surface to catch the clothing or other articles of wear while adjusting the belt to the pulley when the shaft is running. I attain these objects by the mechanism illustrated in the accompanying drawings, in which—

Figure 1 is a plan of one side of my collar with a short section of shafting. Fig. 2 is a plan of the opposite side of my invention. Fig. 3 is an end view. Fig. 4 is an end view with the sections $a$ and $a'$ opened. Fig. 5 is a plan of my collar opened to show method of locking the sections together to prevent displacement when closing said sectors; Fig. 6, a plan of the separated sections of the hinge $b$.

Similar letters refer to similar parts throughout the several views.

$a$ and $a'$ represent two semi-cylindrical pieces of metal, which have corresponding dimensions, and are hinged at $b$ on one of their plane surfaces, and when placed together they form a sleeve, $c$, that has an interior opening which corresponds in size and shape to the circumference and diameter of the shaft to be clamped. Within the plane faces of one portion of the sections are provided one or more recesses, $d$, while upon the opposite portion of the other section of said collar are one or more projections, $e$, that correspond to and fit into said recesses and hold the sections of the sleeve in relative position. One or more bolts, $f$, passing perpendicularly through the projection $d$ and provided with nuts $g$, enable the sections of said collar to be drawn toward each other, and so compress the divided sleeve, causing it to entirely encircle the shaft $h$ and clasp it tightly around its entire circumference, the sleeve being bored out, when slightly expanded, to the same diameter of the shaft. The bolt $f$ is placed within recesses $i$, that are made into the collar from the outside, and are of sufficient depth to allow the head and nut of the bolt to be within the periphery of said collar.

The device is now complete, and is used as follows: The loose pulley is slipped on the shaft beside the tight pulley, or where it is desired. The collar $c$ is then opened, as shown in Fig. 5, and clasped on the shaft beside the loose pulley, and the sections $a$ and $a'$ are drawn together in the manner previously spoken of, thereby clamping the shaft and holding the pulley in place.

What I claim as new, and desire to secure by Letters Patent, is—

A shaft-collar, the combination consisting of a jointed sleeve constructed with interlocking sections $e$ $d$, as shown, and held together by a bolt or bolts, $f$, which set in recesses $i$, as described, the compressing of said sections causing the interior of said sleeve to clamp the circumference of the shaft to which it is applied, and for the purpose set forth.

FREDERICK J. HUBBARD.

Witnesses:
WILLIAM J. BUSSE,
ED A. McCARTNEY.